(12) United States Patent
Gumeci et al.

(10) Patent No.: US 11,862,395 B2
(45) Date of Patent: *Jan. 2, 2024

(54) ENERGY BANK INCLUDING INTEGRATED SUPERCAPACITOR-BATTERY STRUCTURES

(71) Applicant: NISSAN NORTH AMERICA, INC., Franklin, TN (US)

(72) Inventors: Cenk Gumeci, Northville, MI (US); Sandeep Patil, Farmington Hills, MI (US)

(73) Assignee: NISSAN NORTH AMERICA, INC., Franklin, TN (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/539,045

(22) Filed: Nov. 30, 2021

(65) Prior Publication Data

US 2023/0170159 A1 Jun. 1, 2023

(51) Int. Cl.

| | |
|---|---|
| *H01G 11/08* | (2013.01) |
| *H01G 11/46* | (2013.01) |
| *H01G 11/32* | (2013.01) |
| *H01G 11/06* | (2013.01) |
| *H01M 50/102* | (2021.01) |
| *H01M 50/119* | (2021.01) |
| *H01G 11/18* | (2013.01) |

(Continued)

(52) U.S. Cl.
CPC ............. *H01G 11/08* (2013.01); *H01G 11/06* (2013.01); *H01G 11/10* (2013.01); *H01G 11/18* (2013.01); *H01G 11/32* (2013.01); *H01G 11/46* (2013.01); *H01M 50/102* (2021.01); *H01M 50/119* (2021.01); *H01M 50/502* (2021.01)

(58) Field of Classification Search
CPC .. H01M 50/102; H01M 50/119; H01M 16/00; H01M 16/003; H01G 11/08; H01G 11/10; H01G 11/18

See application file for complete search history.

(56) References Cited

U.S. PATENT DOCUMENTS 5,370,663 A * 12/1994 Lin ...................... A61N 1/3956
607/36
8,481,203 B2 7/2013 Reis et al.
(Continued)

FOREIGN PATENT DOCUMENTS

CN 108987118 A * 12/2018 ............. H01G 11/08
JP 09266012 A * 10/1997 ............. H01G 11/08
(Continued)

*Primary Examiner* — Eric W Thomas
(74) *Attorney, Agent, or Firm* — Global IP Counselors, LLP

(57) ABSTRACT

An energy bank includes a plurality of integrated energy storage devices including a plurality of supercapacitors, a plurality of batteries and a plurality of metal shells. Each of the integrated energy storage devices includes a supercapacitor, a battery surrounding the supercapacitor and a metal shell surrounding the battery. The battery forms a shell around an exterior surface of the supercapacitor. The battery includes a first anode, a first cathode, and an electrolyte disposed between the first anode and the first cathode. The supercapacitor includes a second anode, a second cathode, and a separator disposed between the second anode and the second cathode.

17 Claims, 7 Drawing Sheets

(51) Int. Cl.
*H01G 11/10* (2013.01)
*H01M 50/502* (2021.01)

(56) References Cited

U.S. PATENT DOCUMENTS

| | | | | |
|---|---|---|---|---|
| 2002/0064707 | A1* | 5/2002 | Wessman | H01M 10/6554 |
| | | | | 429/120 |
| 2003/0035982 | A1* | 2/2003 | Ryu | H01M 4/381 |
| | | | | 429/188 |
| 2008/0048153 | A1* | 2/2008 | Naoi | B82Y 30/00 |
| | | | | 252/506 |
| 2010/0015512 | A1* | 1/2010 | Inoue | H01G 11/10 |
| | | | | 361/714 |
| 2010/0075210 | A1 | 3/2010 | Lee et al. | |
| 2016/0204492 | A1* | 7/2016 | Jiang | H01G 11/22 |
| | | | | 257/532 |
| 2017/0004930 | A1* | 1/2017 | Picot | H01G 11/08 |
| 2019/0386333 | A1* | 12/2019 | Shen | H01M 10/486 |

FOREIGN PATENT DOCUMENTS

| | | |
|---|---|---|
| JP | 5085651 B2 | 11/2012 |
| JP | 2018085166 A | 5/2018 |
| WO | 2008104375 A2 | 9/2008 |

\* cited by examiner

ENERGY BANK INCLUDING INTEGRATED SUPERCAPACITOR-BATTERY STRUCTURES

BACKGROUND

Technical Field

The present invention generally relates to an energy bank including a plurality of integrated energy storage devices comprising a plurality of supercapacitors, a plurality of batteries and a plurality of metal shells. Each of the integrated energy storage devices comprises a supercapacitor, a battery surrounding the supercapacitor and a metal shell surrounding the battery. The battery forms a shell around an exterior surface of the supercapacitor. The battery includes a first anode, a first cathode, and an electrolyte disposed between the first anode and the first cathode. The supercapacitor includes a second anode, a second cathode, and a separator disposed between the second anode and the second cathode.

Background Information

Electric powered ("E-powered") vehicles are desirable because they offer some of the benefits of electric vehicles— such as reduced carbon dioxide emissions, cost savings on gasoline, responsive drive with smooth acceleration, and lower maintenance due to an efficient electric motor—while also using a gasoline engine to charge the battery or energy pack when required.

However, current E-powered vehicles use expensive power batteries that do not have sufficient power to operate over long distances, for example on roads in the United States. Therefore, it is desirable to provide E-powered vehicles that are less expensive and generate more power.

SUMMARY

It has been discovered that by combining the instant energy provided by supercapacitors with the long-term use benefits of a battery, an integrated energy storage device can be provided that provides increased power, improved durability and a lower cost relative to current power batteries and power battery packs. Furthermore, a plurality of the integrated energy storage devices can desirably be used together in an energy pack to power E-powered vehicles or other hybrid vehicles by providing approximately five times the power of current power batteries with a cost that is one and a half times lower than current power batteries. The integrated energy storage devices can include any type of batteries, such as lithium-ion or solid state batteries.

In particular, it has been discovered that an integrated energy storage device, in which a battery is surrounded by a supercapacitor or a supercapacitor is surrounded by a battery, can be incorporated into an energy pack for a vehicle to provide sufficient power to travel long distances at a lower cost than current power batteries. Furthermore, by using a composite material comprising graphene and a metal oxide in one or more of the electrodes of the supercapacitor, undesirable graphite formation can be prevented. Therefore, it is desirable to provide an energy pack that includes such integrated energy storage devices.

In view of the state of the known technology, one aspect of the present disclosure is to provide an energy bank that includes a plurality of integrated energy storage devices comprising a plurality of supercapacitors, a plurality of batteries and a plurality of metal shells. Each of the integrated energy storage devices comprises a supercapacitor, a battery surrounding the supercapacitor and a metal shell surrounding the battery. The battery forms a shell around an exterior surface of the supercapacitor. The battery includes a first anode, a first cathode, and an electrolyte disposed between the first anode and the first cathode. The supercapacitor includes a second anode, a second cathode, and a separator disposed between the second anode and the second cathode.

Another aspect of the present disclosure is to provide an energy storage bank that includes a plurality of integrated energy storage devices comprising a plurality of supercapacitors, a plurality of batteries and a plurality of metal shells. Each of the integrated energy storage devices comprises a battery, a supercapacitor surrounding the battery, and a metal shell surrounding the supercapacitor. The supercapacitor forms a shell around an exterior surface of the battery. The battery includes a first anode, a first cathode, and an electrolyte disposed between the first anode and the first cathode. The supercapacitor includes a second anode, a second cathode, and a separator disposed between the second anode and the second cathode.

By combining the durability benefits of a battery with the instant energy provided by a supercapacitor into a single integrated energy storage device, the energy storage device can provide enhanced power at a lower cost than current power batteries. Furthermore, by forming the supercapacitor using a composite material comprising graphene and a metal oxide, undesirable graphite formation can be prevented. In addition, by forming the integrated energy storage devices to have a hexagonal shape, when the integrated energy storage devices are used in an energy pack for a vehicle, undesirable gaps or voids between the devices can be avoided, thereby allowing the energy pack to hold more energy storage devices.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
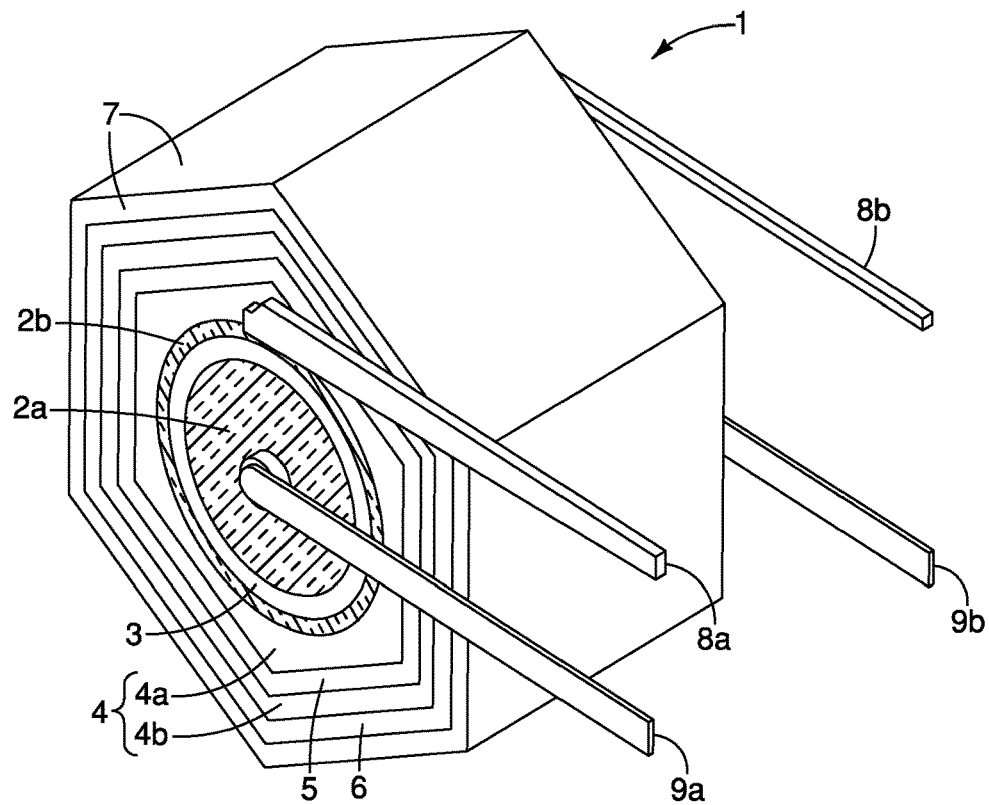
FIG. 1 is a perspective view of an integrated supercapacitor-battery structure according to one embodiment.

Referring initially to FIG. 1, an integrated supercapacitor-battery structure 1 is illustrated in accordance with a first embodiment. The integrated supercapacitor-battery structure 1 includes a first insulating layer 2a, a supercapacitor 3, a second insulating layer 2b, electrode layers 4, electrolyte layer 5 and insulator 6. Electrode layers 4 and electrolyte layer 5 together form the battery portion of the integrated supercapacitor-battery structure. The integrated supercapacitor-battery structure 1 further includes a metal shell 7, battery leads 8a and 8b and supercapacitor leads 9a and 9b. The integrated supercapacitor-battery structure 1 may be used alone or in combination with other similar integrated supercapacitor-battery structures to store energy, for example, in a power bank or an energy bank of a vehicle.

In this embodiment, the battery portion formed by electrode layers 4 and electrolyte layer 5 is formed around the supercapacitor 3 in a core-shell configuration such that the supercapacitor 3 forms a core and the battery portion forms a shell around the supercapacitor 3. However, it should be understood that the supercapacitor may alternatively be formed around the battery portion in a core-shell configuration such that the battery portion forms the core and the supercapacitor forms the shell.

The first insulating layer 2a is formed of any suitable insulating material. For example, the first insulating layer 2a is formed of polypropylene, polyvinylpyrrolidone ("PVP"), Teflon, or polyimide, preferably polypropylene. As shown in FIG. 1, the first insulating layer 2a is provided on an innermost, central portion of the integrated supercapacitor-battery structure 1. The first insulating layer 2a may be formed in the central portion of the integrated supercapacitor-battery structure 1 in any suitable manner. For example, the first insulating layer 2a may be wound with the supercapacitor 3 and the second insulating layer 2b. The first insulating layer 2 has a thickness of approximately 50 µm to 100 µm in an unwound state.

The supercapacitor 3 is a cylindrical structure, preferably a wound structure formed by winding a layered structure that includes an anode, a cathode and an electrolyte provided between the anode and the cathode. The layered structure may also include metal foil layers on opposite sides of the anode and the cathode such that the foil layers form opposite exterior layers of the layered structure. The foil layers may be formed of any suitable metal, such as aluminum or copper.

The supercapacitor 3 includes a plurality of layers each formed of a graphene-metal oxide composite material. At least one of the anode and the cathode, preferably at least the cathode, in the supercapacitor 3 includes a plurality of layers formed of the graphene-metal oxide composite material. The graphene-metal oxide composite material includes graphene and from 5 wt % to 30 wt % of a metal oxide that includes at least one transition metal selected from the group consisting of ruthenium, manganese, and cobalt. The metal oxide is preferably ruthenium oxide ($RuO_2$). The graphene-metal oxide composite material may further include nitrogen. The layers formed of the graphene-metal oxide composite material include pores and each have a porosity of approximately 10% to 40%.

The second insulating layer 2b is formed of any suitable insulating material that insulates the supercapacitor 3 from the battery layers 4 and 5. For example, the second insulating layer 2b is formed of polypropylene, PVP, Teflon, or polyimide, preferably polypropylene. As shown in FIG. 1, the second insulating layer 2b is formed on the outer surface of the cylindrical supercapacitor 3 between the supercapacitor 3 and an innermost electrode layer 4a. The second insulating layer 2b may be formed between the supercapacitor 3 and the innermost electrode layer 4a in any suitable manner. For example, the second insulating layer 2b may be wound with the supercapacitor 3 and the first insulating layer 2a. Alternatively, the second insulating layer 2b may be formed around the supercapacitor 3 by three-dimensional printing or by additive manufacturing. The second insulating layer 2b has a thickness of approximately 50 µm to 100 µm in an unwound state.

As shown in FIG. 1, the electrode layers 4 include an innermost electrode layer 4a that is closest to and in contact with the second insulating layer 2b, and an outermost electrode layer 4b that is closest to the metal shell 7. The innermost electrode layer 4a is a cathode layer, and the outermost electrode layer 4b is an anode layer. However, it should be understood that the innermost electrode layer 4a may be the anode layer, and the outermost electrode layer 4b may be the cathode layer.

Furthermore, the integrated supercapacitor-battery structure 1 may include additional electrode layers 4 and electrolyte layers 5. For example, the integrated supercapacitor-battery structure 1 may include a plurality of anode layers, a plurality of cathode layers, and a plurality of electrolyte layers. The electrode layers 4 and the electrolyte layer 5 may be formed in any suitable manner. For example, the electrode layers 4 and the electrolyte layer 5 may be formed by electrophoretic deposition on the metal shell 7.

The innermost electrode layer 4a includes a cathode active material. For example, the innermost electrode layer 4a includes at least one of the following cathode active materials: $LiTiS_2$, $LiCoO_2$, $LiNiO_2$, $LiMnO_2$, $LiNi_{0.33}Mn_{0.33}Co_{0.33}O_2$ ("NMC"), $LiNi_{0.8}Co_{0.15}Al_{0.05}O_2$, $Li_2MnO_3$, $LiMn_2O_4$, $LiCo_2O_4$, $LiFePO_4$, and $LiMnPO_4$, preferably NMC. The innermost electrode layer 4a may also optionally include a binder such as polyvinylidene fluoride ("PVDF") and/or an additive such as acetylene black. The innermost electrode layer 4a has a thickness of approximately 50 µm to 70 µm.

The outermost electrode layer 4b includes an anode active material. For example, the outermost electrode layer 4b includes at least one of the following anode active materials: lithium, graphite, silicon, and lithium titanium oxide such as $Li_4Ti_5O_{12}$. The outermost electrode layer 4b may also optionally include a binder such as PVDF and/or an additive such as acetylene black. The outermost electrode layer 4b has a thickness of approximately 0.5 µm to 70 µm. For example, when the outermost electrode layer 4b is a lithium foil, the thickness is preferably 0.5 µm to 20 µm, and when the outermost electrode layer 4b is formed of graphite, the thickness of the layer 4b is preferably 50 µm to 70 µm.

The electrolyte layer 5 is formed between the innermost electrode layer 4a and the outermost electrode layer 4b and is formed of any suitable electrolyte material. For example, the electrolyte material is lithium hexafluorophosphate ($LiPF_6$), ethylene carbonate, propylene carbonate, ethyl methyl carbonate or any other suitable electrolyte material for a lithium-ion battery. The electrolyte layer 5 has a thickness of approximately 20 µm to 50 µm.

The insulator 6 is formed of any suitable insulating material. For example, the insulator 6 is formed of polypropylene film or polyester film, preferably polypropylene. As shown in FIG. 1, the insulator 6 is provided between the metal shell 7 and the outermost electrode layer 4b. The insulator 6 may be formed in any suitable manner. For example, the insulator 6 may formed by electrophoretic deposition or three-dimensional printing. The insulator 6 has a thickness of approximately 50 μm to 100 μm.

The metal shell 7 is formed of any suitable metal, such as aluminum, stainless steel or copper. For example, the metal shell 7 is preferably formed of aluminum due to its high conductivity. The metal shell 7 has a hexagonal shape due to the hexagonal shape of the battery formed by electrode layers 4 and electrolyte layer 5. Although the metal shell 7 may have any suitable shape, a hexagonal shape is preferable in order to minimize the gaps or voids between multiple integrated supercapacitor-battery structures all having the same structure as the integrated supercapacitor-battery structure 1 when they are used as part of an energy or power storage bank. The metal shell 7 has a thickness of approximately 0.1 cm to 2 cm.

The battery leads 8a and 8b are electrode leads for the battery portion of the integrated supercapacitor-battery structure 1. The battery lead 8a is a positive electrode lead that is electrically connected to the cathode layer 5a. The battery lead 8b is a negative electrode lead that is electrically connected to the anode layer 5b. The battery leads 8a and 8b may be formed of any suitable material, such as a metal.

The supercapacitor leads 9a and 9b are electrode leads for the supercapacitor 3 of the integrated supercapacitor-battery structure 1. The supercapacitor lead 9a is a positive electrode lead that is electrically connected to the cathode of the supercapacitor 3. The supercapacitor lead 9b is a negative electrode lead that is electrically connected to the anode of the supercapacitor 3.

Second Embodiment

Figure 2A:
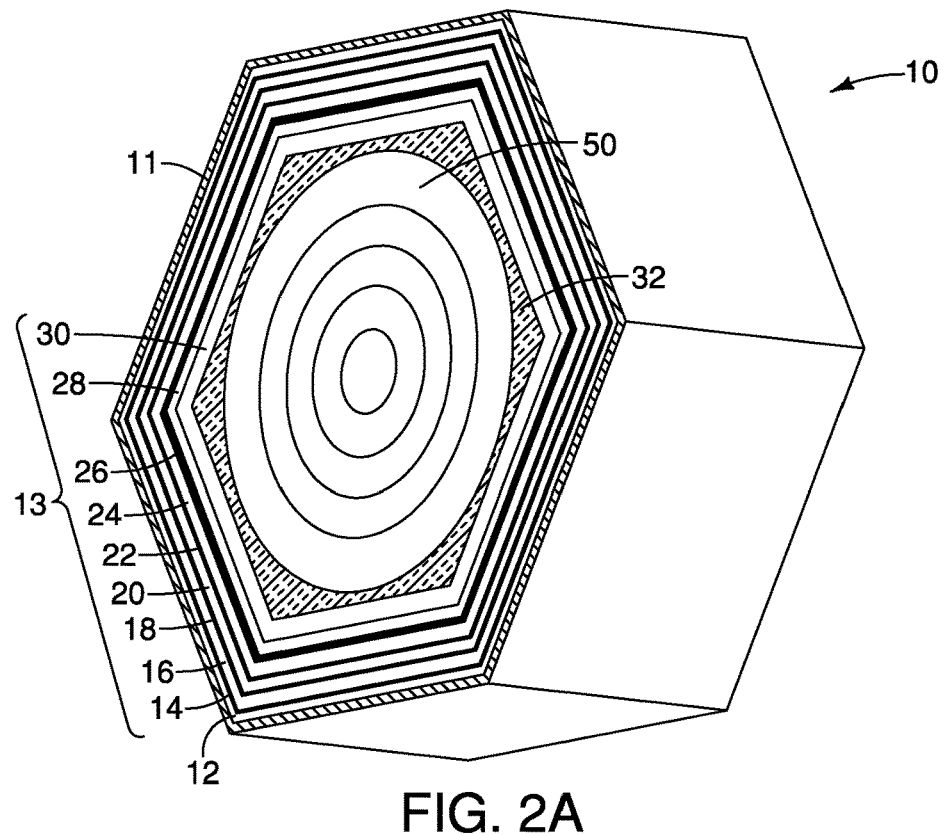
FIG. 2A is a perspective view of an integrated supercapacitor-battery structure according to an embodiment.
Figure 2B:
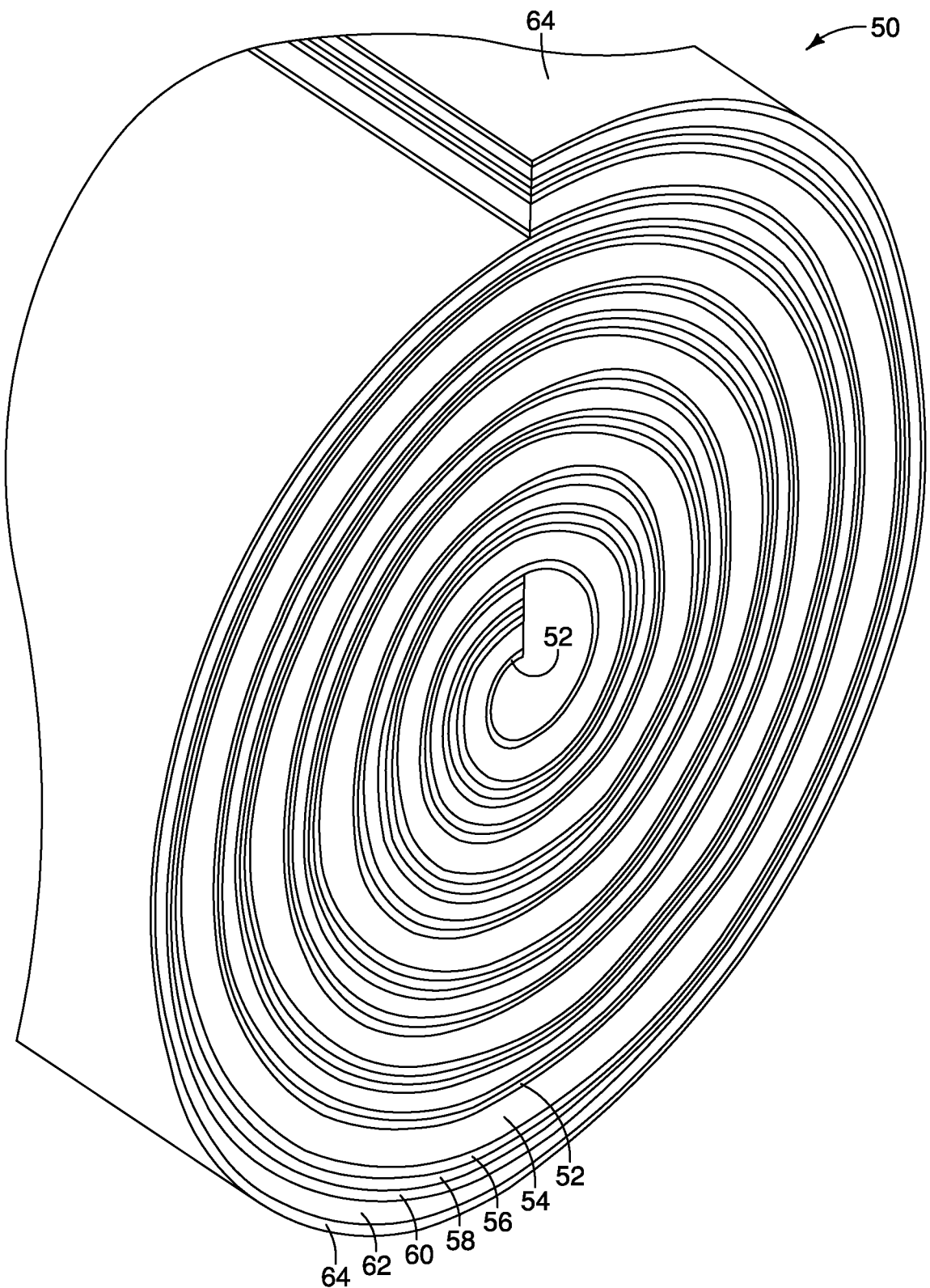
FIG. 2B is a perspective view of the supercapacitor of FIG. 2A in the wound state.

Referring now to FIGS. 2A-2D, an integrated supercapacitor-battery structure 10 in accordance with a second embodiment will now be explained. As shown in FIG. 2A, the integrated supercapacitor-battery structure 10 includes a metal shell 11, a first insulator 12, a battery 13, a third insulator 32 and a supercapacitor 50. The integrated supercapacitor-battery structure 10 may be used alone or in combination with other similar integrated supercapacitor-battery structures to store energy, for example, in a power bank or an energy bank of a vehicle.

In this embodiment, the battery 13 is formed around the supercapacitor 50 in a core-shell configuration such that the supercapacitor 50 forms a core and the battery 13 forms a shell around the supercapacitor 50. However, it should be understood that the supercapacitor may alternatively be formed around the battery in a core-shell configuration such that the battery forms the core and the supercapacitor forms the shell.

The metal shell 11 is formed of any suitable metal, such as aluminum, stainless steel or copper. For example, the metal shell 11 is preferably formed of aluminum due to its high conductivity. The metal shell 11 has a hexagonal shape due to the hexagonal shape of the battery 13. Although the metal shell 11 may have any suitable shape, a hexagonal shape is preferable in order to minimize the gaps or voids between multiple integrated supercapacitor-battery structures all having the same structure as the integrated supercapacitor-battery structure 10 when they are used as part of an energy or power storage bank. The metal shell 11 has a thickness of approximately 0.1 cm to 2 cm.

The first insulator 12 is formed of any suitable insulation material. For example, the first insulator 12 is formed of polypropylene, polyethylene, PVP, Teflon, or polyimide, preferably polypropylene. As shown in FIG. 2A, the first insulator 12 is formed on the metal shell 11 between the metal shell 11 and the battery 13. The first insulator 12 may be formed on the metal shell 11 in any suitable manner. For example, the first insulator 12 may be formed by electrophoretic deposition on the metal shell 11. The first insulator 12 has a thickness of approximately 50 μm to 100 μm and is preferably a polypropylene film or a polyethylene film.

The battery 13 includes an anode current collector 14, a first anode 16, a first electrolyte 18, a first cathode 20, a second insulator 22, a second anode 24, a second electrolyte 26, a second cathode 28 and a cathode current collector 30. It should be understood that the battery 13 may also include additional anode, cathode and electrolyte layers, as long as the anode and cathode layers are separated by an electrolyte and anode and cathode current collectors are provided at opposite ends of the battery 13. The battery 13 is a lithium-ion battery. However, it should be understood that any suitable battery may be used as the battery 13. For example, the battery 13 may alternatively be a solid state battery or a combination of a lithium-ion and all solid state battery. The anode current collector 14, first anode 16, first electrolyte 18, first cathode 20, second insulator 22, second anode 24, second electrolyte 26, second cathode 28 and the cathode current collector 30 are formed in any suitable manner, for example, by electrophoretic deposition.

The anode current collector 14 is formed on the first insulator 12 and is made of any suitable metal. For example, the anode current collector 14 may be formed of copper foil. The anode current collector 14 has a thickness of approximately 10 μm to 20 μm.

The first anode 16 is formed on the anode current collector 14 and includes an anode active material. For example, the first anode 16 includes at least one of the following anode active materials: lithium, graphite, silicon, and lithium titanium oxide such as $Li_4Ti_5O_{12}$. The first anode 16 may also optionally include a binder such as PVDF and/or an additive such as acetylene black. The first anode 16 has a thickness of approximately 0.5 μm to 70 μm, preferably 10 μm to 30 μm. For example, when the first anode 16 is a lithium foil, the thickness is preferably 0.5 μm to 20 μm, and when the first anode 16 is formed of graphite, the thickness of the first anode 16 is preferably 50 μm to 70 μm.

The first electrolyte 18 is formed on the first anode 16 between the first anode 16 and the first cathode 20 and is made of any suitable electrolyte material. For example, the electrolyte material is lithium hexafluorophosphate ($LiPF_6$), ethylene carbonate, propylene carbonate, ethyl methyl carbonate or any other suitable electrolyte material for a lithium-ion battery. The first electrolyte 18 has a thickness of approximately 20 μm to 50 μm.

The first cathode 20 is formed on the first electrolyte 18 and includes a cathode active material. For example, the first cathode 20 includes at least one of the following cathode active materials: $LiTiS_2$, $LiCoO_2$, $LiNiO_2$, $LiMnO_2$, $LiNi_{0.33}Mn_{0.33}Co_{0.33}O_2$ (NMC), $LiNi_{0.8}Co_{0.15}Al_{0.05}O_2$, $Li_2MnO_3$, $LiMn_2O_4$, $LiCo_2O_4$, $LiFePO_4$, and $LiMnPO_4$, preferably NMC. The first cathode 20 may also optionally include a binder such as PVDF and/or an additive such as acetylene black. The first cathode 20 has a thickness of approximately 10 μm to 150 μm, preferably 50 μm to 70 μm.

As shown in FIG. 2A, the second insulator 22 is formed on the first cathode 20 and is made of any suitable insulation material. For example, the second insulator 22 is formed of polypropylene film or polyethylene film, preferably polypropylene. The second insulator 22 has a thickness of approximately 50 μm to 100 μm.

The second anode 24 is formed on the second insulator 22 and includes an anode active material. The anode active material of the second anode 24 may be the same as the anode active material of the first anode 16. For example, the second anode 24 includes at least one of the following anode active materials: lithium, graphite, silicon, and lithium titanium oxide such as $Li_4Ti_5O_{12}$. The second anode 24 may also optionally include a binder such as PVDF and/or an additive such as acetylene black. The second anode 24 has a thickness of approximately 0.5 μm to 70 μm. For example, when the second anode 24 is a lithium foil, the thickness is preferably 0.5 μm to 20 μm, and when the second anode 24 is formed of graphite, the thickness of the second anode 24 is preferably 50 μm to 70 μm.

The second electrolyte 26 is formed on the second anode 24 between the second anode 24 and the second cathode 28 and is made of any suitable electrolyte material. The second electrolyte 26 may be formed of the same electrolyte material as the first electrolyte 18. For example, the electrolyte material is lithium hexafluorophosphate ($LiPF_6$), ethylene carbonate, propylene carbonate, ethyl methyl carbonate or any other suitable electrolyte material for a lithium-ion battery. The second electrolyte 26 has a thickness of approximately 20 μm to 50 μm.

The second cathode 28 is formed on the second electrolyte 26 and includes a cathode active material. The cathode active material of the second cathode 28 may be the same as the cathode active material of the first cathode 20. For example, the second cathode 28 includes at least one of the following cathode active materials: $LiTiS_2$, $LiCoO_2$, $LiNiO_2$, $LiMnO_2$, $LiNi_{0.33}Mn_{0.33}Co_{0.33}O_2$ (NMC), $LiNi_{0.08}Co_{0.15}Al_{0.05}O_2$, $Li_2MnO_3$, $LiMn_2O_4$, $LiCo_2O_4$, $LiFePO_4$, and $LiMnPO_4$, preferably NMC. The second cathode 28 may also optionally include a binder such as PVDF and/or an additive such as acetylene black. The second cathode 28 has a thickness of approximately 50 μm to 70 μm.

The cathode current collector 30 is formed on the second cathode 28 and is made of any suitable metal. The cathode current collector 30 may be formed of the same material as the anode current collector 14. For example, the cathode current collector 30 may be formed of copper foil. The cathode current collector 30 has a thickness of approximately 10 μm to 20 μm.

The third insulator 32 is formed on the cathode current collector 30 and is made of any suitable insulation material. For example, the third insulator 32 is formed of polypropylene film or polyethylene film, preferably polypropylene. The third insulator 32 has a thickness of approximately 50 μm to 100 μm.

The supercapacitor 50 is a cylindrical structure, preferably a wound structure formed by winding a layered structure. As shown in detail in FIG. 2B, the supercapacitor is a wound structure that includes an insulator 52, a metal layer 54, an anode 56, a separator 58, a cathode 60, a metal layer 62 and an insulator 64. The insulator 52 and insulator 64 are wound together with the metal layer 54, the anode 56, the separator 58, the cathode 60 and the metal layer 62 to form the cylindrical supercapacitor 50.

Figure 2C:
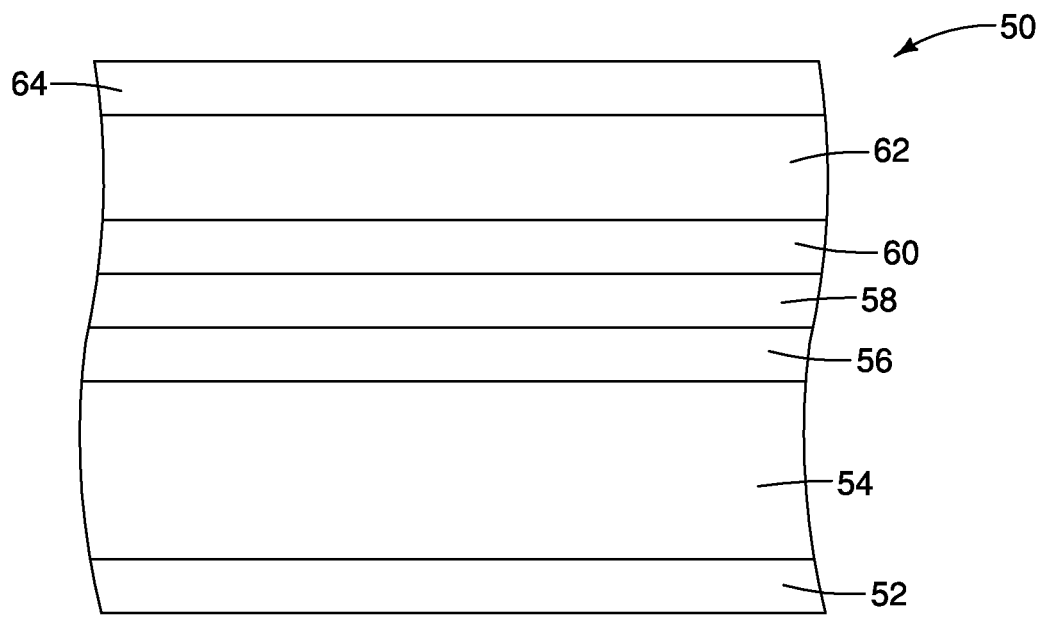
FIG. 2C is a cross-sectional view of the supercapacitor of FIG. 2B in the unwound state.
Figure 2D:
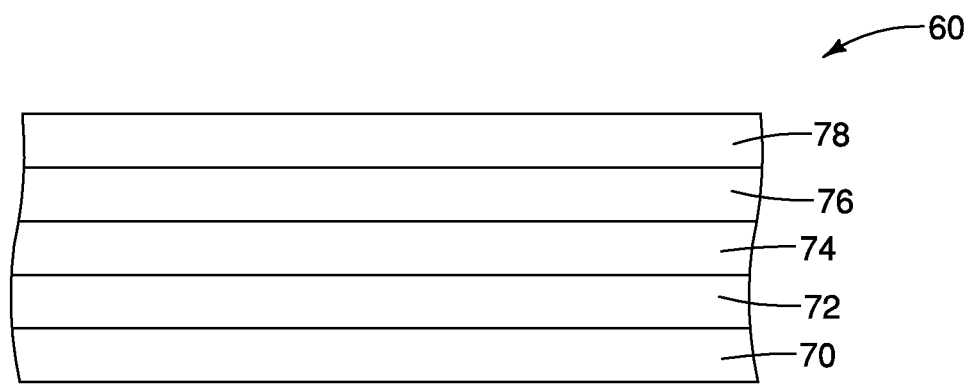
FIG. 2D is a cross-sectional view of the cathode of the supercapacitor of FIG. 2B.

FIG. 2C shows the supercapacitor 50 in an unwound state. The insulator 52 is formed of any suitable insulation material. For example, the insulator 52 is formed of polypropylene, PVP, Teflon, or polyimide, preferably polypropylene. The insulator 52 has a thickness of approximately 50 μm to 100 μm.

The metal layer 54 is formed of any suitable metal material. For example, the metal layer 54 is formed of an aluminum foil or a copper foil. The metal layer 54 has a thickness of approximately 200 μm to 300 μm.

The anode 56 is formed on the metal layer 54 and includes an anode active material. For example, the anode 56 has a porosity of approximately 10% to 40% and includes at least one of the following anode active materials: lithium, graphite, silicon, and lithium titanium oxide such as $Li_4Ti_5O_{12}$. The anode 56 may also optionally include a binder such as PVDF and/or an additive such as acetylene black. The anode 56 may include a single layer or a plurality of layers. The anode 56 is formed in any suitable manner. For example, the anode 56 may be formed by mixing the anode active material, the binder and the additive with a solvent such as N-methyl-2-pyrolidone ("NMP"), homogenizing the mixture and casting the homogenized mixture onto the metal layer 54 using a doctor blade. The total thickness of the anode 56 is approximately 20 μm to 50 μm.

The separator 58 is formed between the anode 56 and the cathode 60 and is made of any suitable membrane for separating a cathode and an anode. For example, the separator may be formed of cellulose, polyethylene terephthalate ("PET"), propylene, polypropylene, PVDF, polyethylene, polyimide, or any mixture thereof, preferably propylene. The separator 58 has a thickness of approximately 20 μm to 50 μm.

The cathode 60 is formed on the separator 58. As shown in detail in FIG. 2D, the cathode 60 includes five layers 70, 72, 74, 76 and 78. The five layers 70, 72, 74, 76 and 78 have the same material composition. However, it should be understood that the cathode 60 can be formed of any suitable number of layers depending on the length of a unit cell, and the layers may have the same or different material compositions.

Each of the layers 70, 72, 74, 76 and 78 has a porosity of approximately 10% to 40% and includes a graphene-metal oxide composite material as a cathode active material. The graphene-metal oxide composite material includes graphene and from 5 wt % to 30 wt % of a metal oxide relative to a total weight of the composite material. The metal oxide includes at least one transition metal selected from the group consisting of: ruthenium, manganese, and cobalt. The metal oxide is preferably ruthenium oxide ($RuO_2$). The graphene-metal oxide composite material may further include nitrogen. For example, the graphene-metal oxide composite material can be doped with nitrogen such that the composite material includes 1 wt % to 5 wt % of nitrogen.

Each of the layers 70, 72, 74, 76 and 78 may also optionally include a binder such as PVDF and/or an additive such as acetylene black. The thickness of the layers 70, 72, 74, 76 and 78, as well as the number of the graphene-composite oxide layers included in the cathode 60, can be varied as long as the total thickness of the cathode 60 is approximately 20 μm to 50 μm.

In this embodiment, the supercapacitor 50 has an asymmetric configuration in which the anode 56 and the cathode 60 are formed of different active materials. However, it should be understood that the supercapacitor 50 may also have a symmetric configuration in which the anode 56 and the cathode 60 are both formed of a plurality of layers that include the graphene-composite oxide material as an active material. The cathode 60 is formed in any suitable manner. For example, the cathode 60 may be formed by mixing the graphene-metal oxide composite material, the binder and the additive with a solvent such as NMP, homogenizing the mixture and casting the homogenized mixture onto the metal layer 62 using a doctor blade.

The metal layer 62 is formed of any suitable metal material. For example, the metal layer 62 is formed of an aluminum foil or a copper foil. The metal layer 62 has a thickness of approximately 200 μm to 300 μm.

The insulator 64 is formed of any suitable insulation material. For example, the insulator 64 is formed of polypropylene, PVP, Teflon, or polyimide, preferably polypropylene. The insulator 64 has a thickness of approximately 50 μm to 100 μm.

Third Embodiment

Figure 3:
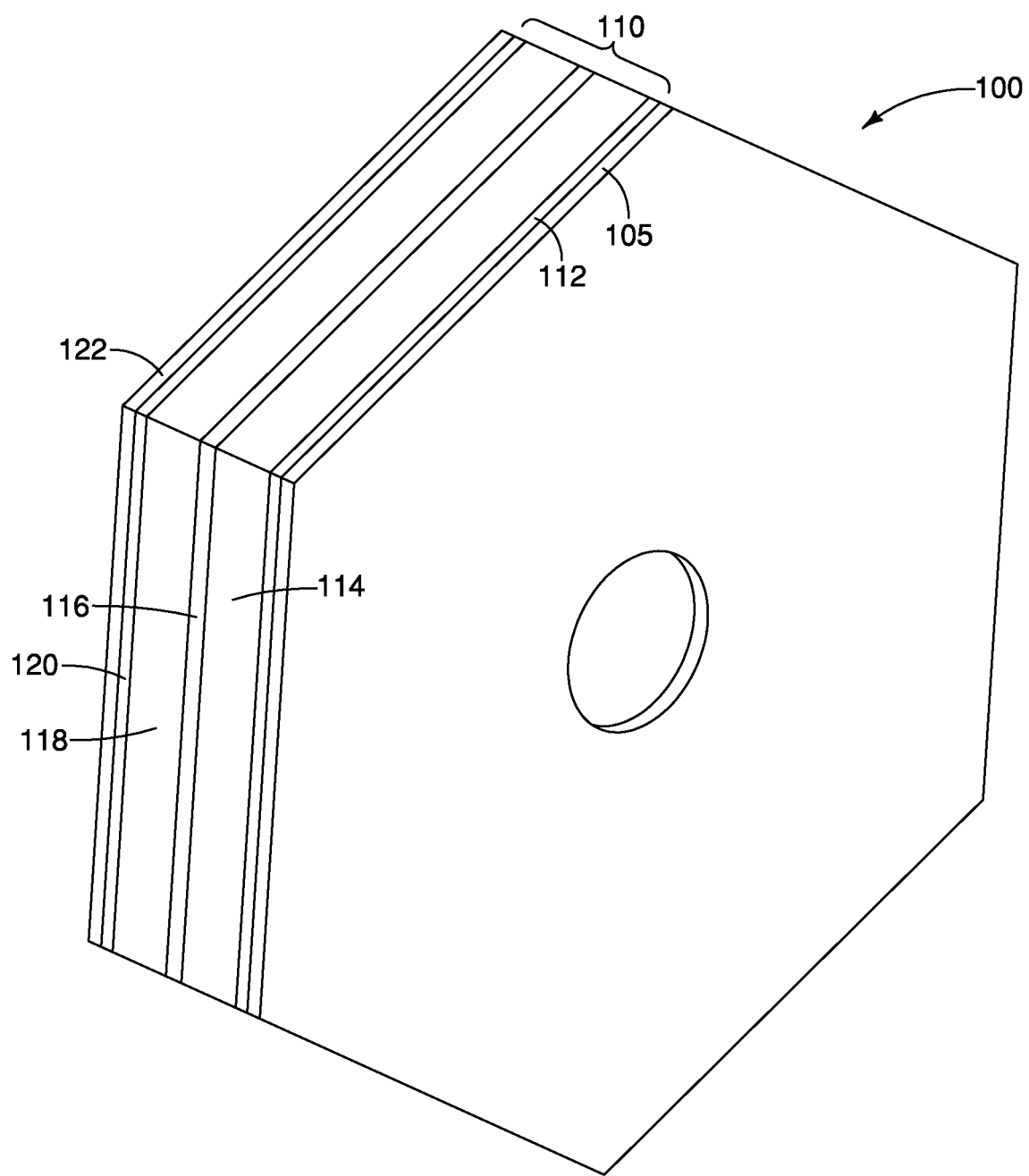
FIG. 3 is a perspective view of an integrated supercapacitor-battery structure according to an embodiment.

Referring now to FIG. 3, an integrated supercapacitor-battery structure 100 in accordance with a third embodiment will now be explained. As shown in FIG. 3, the integrated supercapacitor-battery structure 100 includes a first insulator 105, a battery 110, a second insulator 122 and a supercapacitor 150. The integrated supercapacitor-battery structure 100 may be used alone or in combination with other similar integrated supercapacitor-battery structures to store energy, for example, in a power bank or an energy bank of a vehicle.

In this embodiment, the battery 110 is formed around the supercapacitor 150 in a core-shell configuration such that the supercapacitor 150 forms a core and the battery 110 forms a shell around the supercapacitor 150. However, it should be understood that the supercapacitor may alternatively be formed around the battery in a core-shell configuration such that the battery forms the core and the supercapacitor forms the shell.

Although not shown in the perspective view of FIG. 3, it should be understood that the edge of the first insulator 105, the battery 110, the second insulator 122 and the supercapacitor is surrounded by a metal shell having a hexagonal shape similar to the metal shell 7 of the first embodiment and the metal shell 11 of the second embodiment. For example, the metal shell in the integrated supercapacitor-battery structure 100 is formed of any suitable metal, such as aluminum, stainless steel or copper, preferably aluminum due to its high conductivity. The integrated supercapacitor-battery structure 100 of the third embodiment can be used with other integrated supercapacitor-battery structures all having the same structure as the integrated supercapacitor-battery structure 100 as part of an energy or power storage bank.

The first insulator 105 is formed of any suitable insulation material. For example, the first insulator 105 is formed of polypropylene film or polyethylene film, preferably polypropylene. The first insulator 105 has a thickness of approximately 50 μm to 100 μm.

The battery 110 includes a cathode current collector 112, a cathode 114, an electrolyte 116, an anode 118 and an anode current collector 120. It should be understood that the battery 110 may also include additional anode, cathode and electrolyte layers, as long as the anode and cathode layers are separated by an electrolyte and anode and cathode current collectors are provided at opposite ends of the battery 110. The battery 110 is an all solid state battery. However, it should be understood that any suitable battery may be used as the battery 110. For example, the battery 110 may alternatively be a lithium-ion battery or a combination of a lithium-ion and all solid state battery. The cathode current collector 112, cathode 114, electrolyte 116, anode 118 and the anode current collector 120 are formed in any suitable manner, for example, by electrophoretic deposition or three-dimensional printing, preferably electrophoretic deposition when the battery 110 is an all solid state battery.

The cathode current collector 112 is formed on the first insulator 105 and is made of any suitable metal. For example, the cathode current collector 112 may be formed of copper foil. The cathode current collector 112 has a thickness of approximately 10 μm to 20 μm.

The cathode 114 is formed on the cathode current collector 112 and includes a cathode active material. For example, the cathode 114 includes at least one of the following cathode active materials: LiS, $LiCoO_2$, $LiNi_{0.33}Co_{0.33}Mn_{9.33}O_2$, $LiMn_2O_4$, and $LiNi_{0.8}Co_{0.15}Al_{0.05}O_2$. The cathode 114 may also optionally include a binder such as PVDF and/or an additive such as acetylene black. The cathode 114 is a solid state composite and has a thickness of approximately 70 μm to 150 μm.

The electrolyte 116 is formed on the cathode 114 between the cathode 114 and the anode 118 and is made of any suitable solid electrolyte material for an all-solid-state battery. For example, the solid electrolyte material is $Li_7La_3Zr_2O_{12}$, $Li_{10}GeP_2S_{12}$, $Li_7La_3Zr_2O_{12}$, $Li_{6.75}La_3Zr_{1.75}Nb_{0.25}O_{12}$, $Li_{7.06}La_3Y_{0.06}Zr_{1.94}O_{12}$, $Li_{6.6}La_3Zr_{1.6}Sb_{0.4}O_{12}$, $Li_{6.28}Al_{0.24}La_3Zr_2O_{12}$, $Li_{5.9}Al_{0.2}La_3Zr_{1.75}W_{0.25}O_{12}$, $Li_{6.25}Ga_{0.25}La_3Zr_2O_{12}$, $Li_{6.20}Ga_{0.30}La_{2.95}Rb_{0.05}Zr_2O_{12}$, $LiZr_2(PO_4)_3$, $Li_{3x}La_{2/3-x}TiO_3$ ("LLTO"), $Li_{14}Zn(GeO_4)_4$, $Li_{4-x}Ge_{1-x}P_xS_4$ (0<x<1), and $Li_6PS_5X$ (X=Cl, Br, or I). The electrolyte 116 has a thickness of approximately 5 μm to 30 μm.

The anode 118 is formed on the electrolyte 116 and includes an anode active material. For example, the anode 118 includes at least one of the following anode active materials: Li, Si or graphite, preferably lithium. The anode 118 may also optionally include a binder such as PVDF and/or an additive such as acetylene black. The anode 118 has a thickness of approximately 10 μm to 30 μm.

The insulator 120 is formed on the anode 118 and is made of any suitable insulation material. For example, the insulator 120 is formed of polypropylene film or polyethylene film, preferably polypropylene. The insulator 120 has a thickness of approximately 50 μm to 100 μm.

The supercapacitor 150 has the same structure and composition as the supercapacitor 50 of the second embodiment. For example, the supercapacitor 150 is a cylindrical structure, preferably a wound structure formed by winding a layered structure that includes a first insulator, a first metal layer, an anode, a separator, a cathode, a second metal layer and a second insulator.

Fourth Embodiment

Figure 4A:
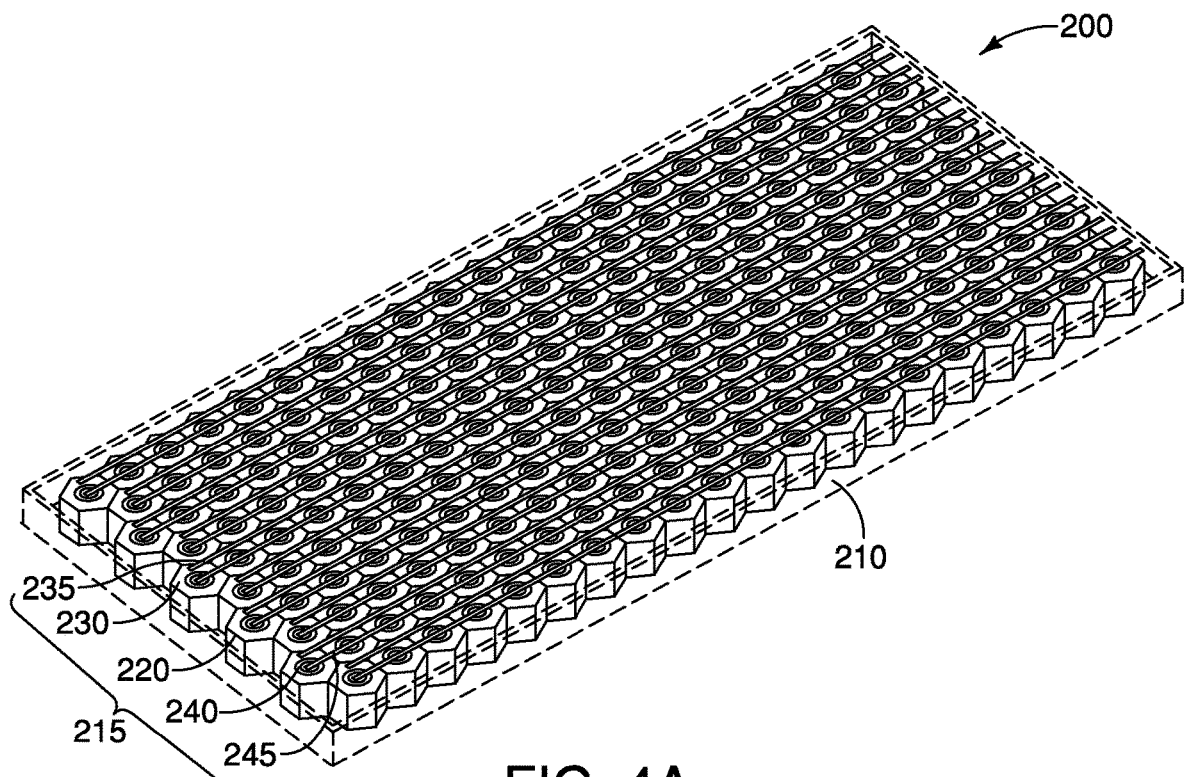
FIG. 4A is a perspective view of an energy storage bank including a plurality of integrated supercapacitor-battery structures according to one embodiment.
Figure 4B:
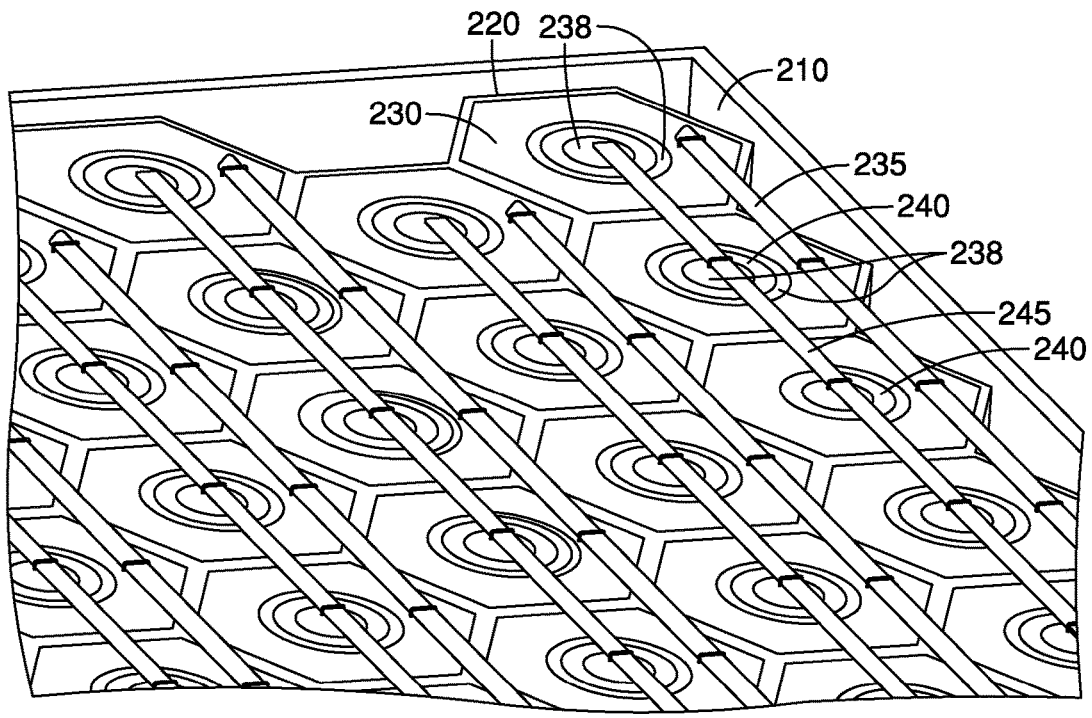
FIG. 4B is an exploded top view of a portion of the energy storage bank of FIG. 4A.
Figure 4C:
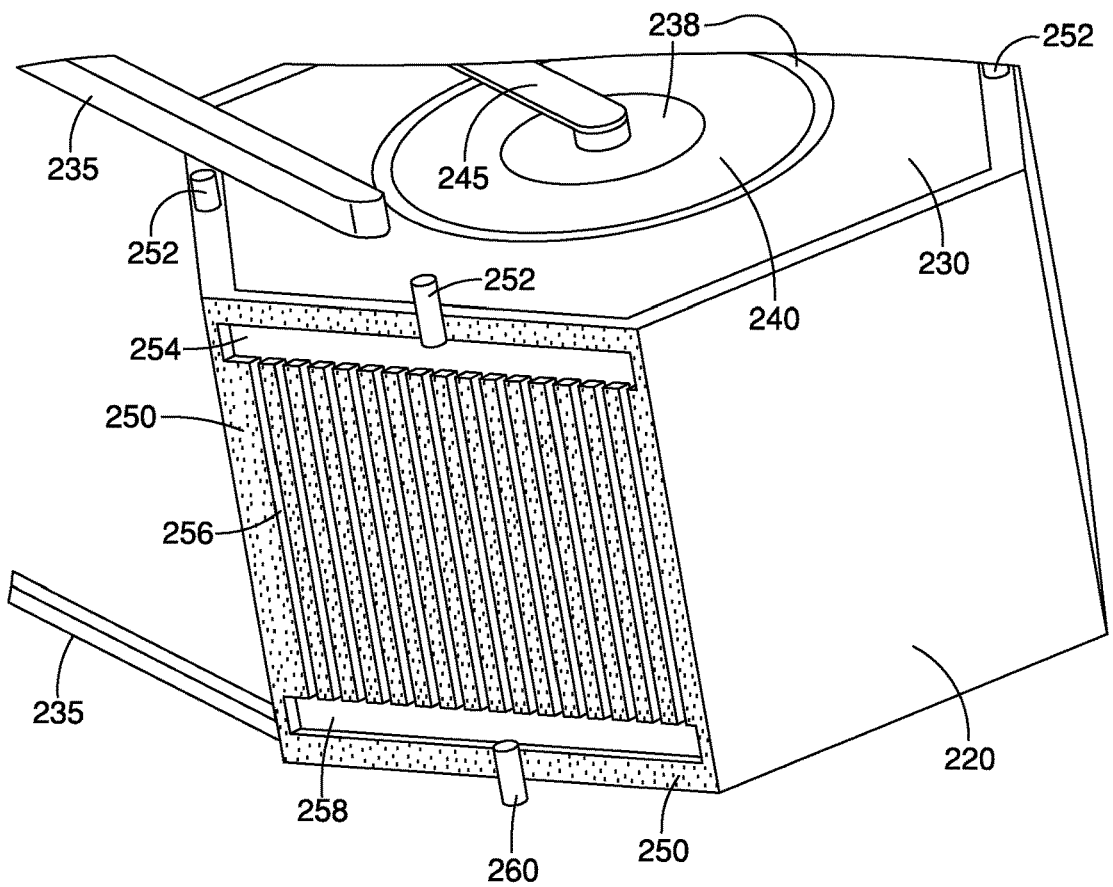
FIG. 4C is an exploded perspective view of a single integrated supercapacitor-battery structure of FIG. 4A.

Referring now to FIGS. 4A-4C, an integrated supercapacitor-battery energy bank 200 in accordance with a fourth embodiment will now be explained. As shown in FIG. 4A, the integrated supercapacitor-battery energy bank 200 includes a metal frame 210, and a plurality of integrated supercapacitor-battery structures 215. Each of the integrated supercapacitor-battery structures 215 includes a metal support 220, a battery 230, battery leads 235 on opposite sides of the integrated supercapacitor-battery structure, a supercapacitor 240 and supercapacitor leads 245 on opposite sides of the integrated supercapacitor-battery structure.

As shown in FIG. 4A, the integrated supercapacitor-battery structures 215 form a network of integrated energy storage devices for the energy bank 200. The integrated supercapacitor-battery structures 215 are each surrounded by a portion of the metal support 220. The metal frame 210 is formed of any suitable metal, such as aluminum, stainless steel or copper. For example, the metal frame 210 is preferably formed of aluminum due to its high conductivity.

The metal support 220 is a network of metal having a plurality of holes formed therein. As shown in FIG. 2A, the holes each have a hexagonal shape designed to surround the integrated supercapacitor-battery structures 215. Although the holes in the metal support 220 may have any suitable shape, a hexagonal shape is preferable in order to minimize the gaps or voids between the integrated supercapacitor-battery structures 215. The metal support 220 has a thickness of approximately 0.1 cm to 2 cm.

In this embodiment, for each of the integrated supercapacitor-battery structures 215, the battery 230 is formed around the supercapacitor 240 in a core-shell configuration such that the supercapacitor 240 forms a core and the battery 230 forms a shell around the supercapacitor 240. However, it should be understood that the supercapacitor may alternatively be formed around the battery in a core-shell configuration such that the battery forms the core and the supercapacitor forms the shell.

The battery 230 may be the same as the battery 13 of the second embodiment and includes at least one anode layer, at least one electrolyte layer, and at least one cathode layer. It should be understood that the battery 230 may include a plurality of anode, cathode and electrolyte layers, as long as the anode and cathode layers are separated by an electrolyte. The battery 230 is a lithium-ion battery. However, it should be understood that any suitable battery may be used as the battery 230. For example, the battery 230 may alternatively be a solid state battery or a combination of a lithium-ion and all solid state battery. The battery 230 may be formed in any suitable manner, for example by electrophoretic deposition.

The battery leads 235 are electrode leads for the batteries 230 of the integrated supercapacitor-battery structures 215. As shown in FIGS. 4B and 4C, the battery leads 235 include a positive electrode lead and a negative electrode lead on opposite sides of each battery 230 of the integrated supercapacitor-battery structures 215. The battery leads 235 may be formed of any suitable material, such as a metal.

As shown in FIG. 4B, each of the integrated supercapacitor-battery structures 215 includes an insulator 238 formed between the battery 230 and the supercapacitor 240 and in a central portion of the supercapacitor 240. The insulator 238 is formed of any suitable insulation material and may be the same as the insulator 52 or the insulator 64 of the second embodiment. For example, the insulator 238 is formed of polypropylene, PVP, Teflon, or polyimide, preferably polypropylene. The insulator 238 provided between the battery 230 and the supercapacitor 240 has a thickness of approximately 50 μm to 100 μm. The insulator 238 may be formed in any suitable manner. For example, the insulator 238 may be wound together with the layers of the supercapacitor 240 or formed by three-dimensional printing or additive manufacturing, preferably winding with the supercapacitor 240.

The supercapacitor 240 is a cylindrical structure, preferably a wound structure formed by winding a layered structure. The supercapacitor 240 may be the same as the supercapacitor 50 of the second embodiment and includes an anode, a cathode and a separator formed between the anode and the cathode.

The supercapacitor leads 245 are electrode leads for the supercapacitors 240 of the integrated supercapacitor-battery structures 215. As shown in FIGS. 4B and 4C, the supercapacitor leads 245 include a positive electrode lead and a negative electrode lead on opposite sides of each supercapacitor 240 of the integrated supercapacitor-battery structures 215. The supercapacitor leads 245 may be formed of any suitable material, such as a metal.

As shown in FIGS. 4A and 4B, in this embodiment, the energy bank 200 includes a plurality of battery leads 235 and a plurality of supercapacitor leads 245 that are each connected to each other to form flow passages therebetween for coolant to flow over the energy bank 200.

However, it should be understood that instead of a plurality of battery leads 235 and supercapacitor leads 245, a single battery lead 235 may be provided on each of the top and bottom sides of the integrated supercapacitor-battery structures 215 to connect to each of the batteries 230, and a single supercapacitor lead 245 may be provided on each of the top and bottom sides of the integrated supercapacitor-battery structures 215 to connect to each of the supercapacitors 240.

As shown in FIG. 4C, the internal structure of the metal support 220 includes a wall 250, a coolant outlet 252, a top coolant space 254, a plurality of vertical coolant passages 256, a bottom coolant space 258, and a coolant inlet 260. The wall 250 is porous.

The coolant outlet 252 is a pipe protruding out of the top of the metal support 220. The coolant outlet 252 may be formed by any suitable material, such as a metal. For example, the coolant outlet 252 may be formed of the same material as the metal support 220. The size of the coolant outlet 252 is not particularly limited and may be any suitable size for cooling the integrated supercapacitor-battery structures 215.

The top coolant space 254, the plurality of vertical coolant passages 256, and the bottom coolant space 258 are each formed as holes or voids in the wall 250 of the metal support 220. The size and number of vertical coolant passages 256 is not particularly limited and may be any suitable size and number to cool the integrated supercapacitor-battery structures 215.

The coolant inlet 260 is a pipe protruding out of the bottom of the metal support 220. The coolant inlet 260 may be formed by any suitable material, such as a metal. For example, the coolant inlet 260 may be formed of the same material as the metal support 200. The size of the coolant inlet 260 is not particularly limited and may be any suitable size for cooling the integrated supercapacitor-battery structures 215.

In this embodiment, a coolant flows into the coolant inlet 260 to the bottom coolant space 258, is distributed to each of the vertical coolant passages 256, flows upward into the top coolant space 254, and exits through the coolant outlet 252. The coolant may be any suitable coolant for cooling the integrated supercapacitor-battery structures 215. For example, the coolant may be air, water or refrigerant.

In this embodiment, the metal support 220 is provided with the internal wall 250 having the structure for coolant flow shown in FIG. 4C for each of the integrated battery-supercapacitor structures 215. However, it should be understood that the internal wall 250 of FIG. 4C may be provided for only one or more than one but less than all of the integrated battery-supercapacitor structures 215 of the energy bank 200, as long as the energy bank 200 is sufficiently cooled.

Fifth Embodiment

Figure 5A:
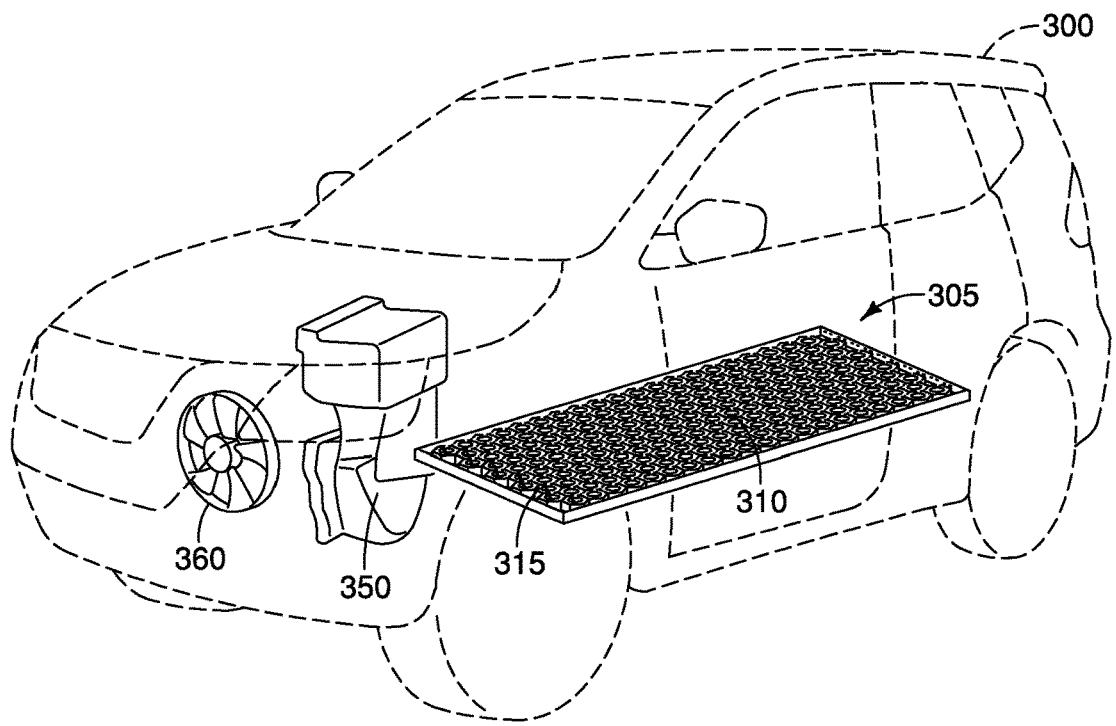
FIG. 5A is a perspective view of a vehicle including an energy storage bank according to an embodiment.
Figure 5B:
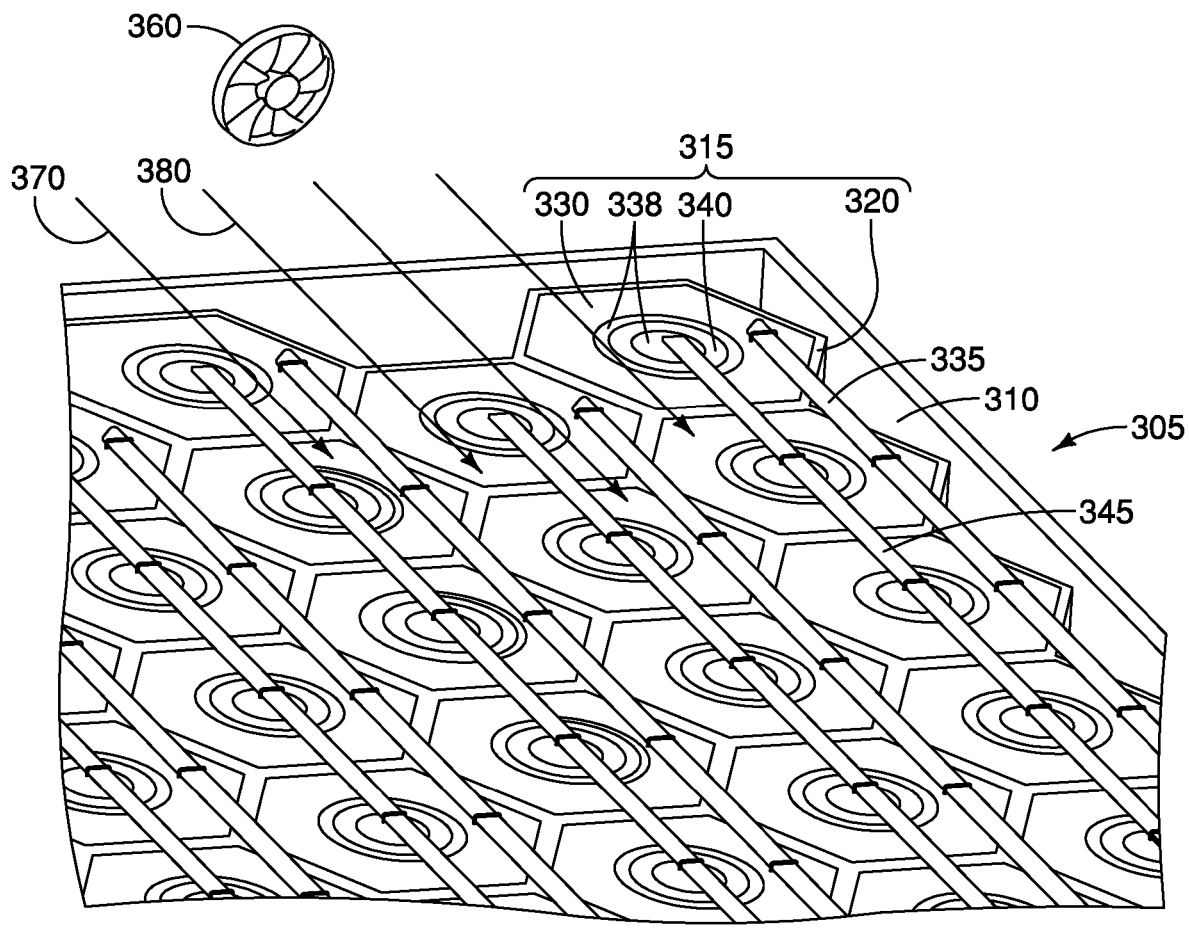
FIG. 5B is an exploded top view of the vehicle of FIG. 5B.

Referring now to FIGS. 5A-5B, a vehicle 300 including an integrated supercapacitor-battery energy bank 305 in accordance with a fifth embodiment will now be explained. As shown in FIG. 5A, the vehicle 300 includes an integrated supercapacitor-battery energy bank 305 having a metal frame 310 and a plurality of integrated supercapacitor-battery structures 315. As shown in detail in FIG. 5B, each of the integrated supercapacitor-battery structures 315 includes a metal support portion 320, a battery 330, battery leads 335 on opposite sides of the integrated supercapacitor-battery structure 315, an insulator 338, a supercapacitor 340 and supercapacitor leads 345 on opposite sides of the integrated supercapacitor-battery structure 315.

As shown in FIG. 5B the integrated supercapacitor-battery structures 315 form a network of integrated energy storage devices for the energy bank 305. The integrated supercapacitor-battery structures 315 are each surrounded by a portion of the metal support 320. The metal frame 310 can be the same as the metal frame 210 of the fourth embodiment and is formed of any suitable metal, such as aluminum, stainless steel or copper. For example, the metal frame 310 is preferably formed of aluminum due to its high conductivity.

The metal support 320 can be the same as the metal support 220 of the fourth embodiment and is a network of metal having a plurality of holes formed therein. As shown in FIG. 5A, the holes each have a hexagonal shape designed to surround the integrated supercapacitor-battery structures 315. Although the holes in the metal support 320 may have any suitable shape, a hexagonal shape is preferable in order to minimize the gaps or voids between the integrated supercapacitor-battery structures 315. The metal support 320 has a thickness of approximately 0.1 cm to 2 cm.

In this embodiment, for each of the integrated supercapacitor-battery structures 315, the battery 330 is formed around the supercapacitor 340 in a core-shell configuration such that the supercapacitor 340 forms a core and the battery 330 forms a shell around the supercapacitor 340. However, it should be understood that the supercapacitor may alternatively be formed around the battery in a core-shell configuration such that the battery forms the core and the supercapacitor forms the shell.

The battery 330 may be the same as the battery 230 of the fourth embodiment and includes at least one anode layer, at least one electrolyte layer, and at least one cathode layer. It should be understood that the battery 330 may include a plurality of anode, cathode and electrolyte layers, as long as the anode and cathode layers are separated by an electrolyte. The battery 330 is a lithium-ion battery. However, it should be understood that any suitable battery may be used as the battery 330. For example, the battery 330 may alternatively be a solid state battery or a combination of a lithium-ion and all solid state battery. The battery 330 may be formed in any suitable manner, for example by electrophoretic deposition.

The battery leads 335 can be the same as the battery leads 235 of the fourth embodiment and are electrode leads for the batteries 330 of the integrated supercapacitor-battery structures 315. As shown in FIG. 5B, the battery leads 335 include a positive electrode lead and a negative electrode lead on opposite sides of each battery 330 of the integrated supercapacitor-battery structures 315. The battery leads 335 may be formed of any suitable material, such as a metal.

As shown in FIG. 5B, each of the integrated supercapacitor-battery structures 315 includes an insulator 338 formed between the battery 330 and the supercapacitor 340 and in a central portion of the supercapacitor 340. The insulator 338 is formed of any suitable insulation material and may be the same as the insulator 238 of the fourth embodiment. For example, the insulator 338 is formed of polypropylene, PVP, Teflon, or polyimide, preferably polypropylene. The insulator 338 provided between the battery 330 and the supercapacitor 340 has a thickness of approximately 50 µm to 100 µm. The insulator 338 may be formed in any suitable manner. For example, the insulator 338 may be wound together with the layers of the supercapacitor 340.

The supercapacitor 340 is a cylindrical structure, preferably a wound structure formed by winding a layered structure. The supercapacitor 340 may be the same as the supercapacitor 240 of the fourth embodiment and includes an anode, a cathode and a separator formed between the anode and the cathode.

The supercapacitor leads 345 are electrode leads for the supercapacitors 340 of the integrated supercapacitor-battery structures 315. As shown in FIG. 5B, the supercapacitor leads 345 include a positive electrode lead and a negative electrode lead on opposite sides of each supercapacitor 240 of the integrated supercapacitor-battery structures 215. The supercapacitor leads 245 may be formed of any suitable material, such as a metal.

As shown in FIG. 5B, in this embodiment, the energy bank 305 includes a plurality of battery leads 335 and a plurality of supercapacitor leads 345 that are each connected to each other to form flow passages 370 and 380 therebetween. However, it should be understood that instead of a plurality of battery leads 335 and supercapacitor leads 345, a single battery lead 335 may be provided on each of the top and bottom sides of the integrated supercapacitor-battery structures 315 to connect to each of the batteries 330, and a single supercapacitor lead 345 may be provided on each of the top and bottom sides of the integrated supercapacitor-battery structures 315 to connect to each of the supercapacitors 340.

The vehicle 300 also includes a powertrain 350 and a fan 360. The powertrain 350 includes a gasoline engine, a power generator, an inverter and an electric motor. The vehicle 300 is a partial electric vehicle ("EV") in which the wheels are completely driven by the electric motor and the gasoline engine is used to charge the integrated battery-supercapacitor structures 325 of the energy batik 305. Thus, both the energy batik 305 and the gasoline engine are used to power the vehicle 300.

The fan 360 is used to cool the energy bank 305. As shown in detail in FIG. 5B, the fan 360 is used to provide air flow into the gas flow passages 370 and 380 between the battery leads 335 and the supercapacitor leads 345.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiment(s), the following directional terms "top", "bottom", "forward", "rearward", "above", "downward", "vertical", "horizontal" and "below" as well as any other similar directional terms refer to those directions of a vehicle equipped with the integrated battery-supercapacitor structure or an energy bank including a plurality of the integrated battery-supercapacitor structures. Accordingly, these terms, as utilized to describe the present invention should be interpreted relative to a vehicle equipped with the with the integrated battery-supercapacitor structure or an energy bank including a plurality of the integrated battery-supercapacitor structures.

The term "configured" as used herein to describe a component, section or part of a device includes hardware and/or software that is constructed and/or programmed to carry out the desired function.

The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. An energy storage bank comprising:
   a plurality of integrated energy storage devices comprising a plurality of supercapacitors, a plurality of batteries and a plurality of metal shells, each of the integrated energy storage devices comprising:
   a supercapacitor;
   a battery surrounding the supercapacitor such that the battery forms a shell around an exterior surface of the supercapacitor; and
   a metal shell surrounding the battery,
   the battery including a first anode, a first cathode, and an electrolyte disposed between the first anode and the first cathode,
   the supercapacitor including a second anode, a second cathode, and a separator disposed between the second anode and the second cathode, and
   the supercapacitor having a cylindrical structure in which the second anode, the second cathode and the separator are wound together.

2. The energy storage bank according to claim 1, wherein the battery has a hexagonal shape.

3. The energy storage bank according to claim 1, further comprising
   for each of the integrated energy storage devices, an insulating material surrounding the exterior surface of the supercapacitor, the insulating material being disposed between the battery and the supercapacitor.

4. The energy storage bank according to claim 1, wherein the metal shell is formed of at least one of aluminum, stainless steel and copper.

5. The energy storage bank according to claim 1, wherein the plurality of metal shells is interconnected to form a metal frame.

6. The energy storage bank according to claim 5, wherein at least one flow passage is provided within the metal frame.

7. The energy storage bank according to claim 1, wherein the battery is a lithium ion battery or a solid state battery.

8. The energy storage bank according to claim 1, wherein at least one of the second anode and the second cathode comprises at least one layer of a composite material including graphene and a metal oxide.

9. The energy storage bank according to claim 8, wherein the metal oxide includes at least one transition metal selected from the group consisting of: ruthenium, manganese, and cobalt.

10. The energy storage bank according to claim 8, wherein
    the composite material includes 5 wt % to 30 wt % of the metal oxide relative to a total weight of the composite material.

11. The energy storage bank according to claim 1, further comprising
    a plurality of supercapacitor leads, each of the supercapacitor leads connected to one of the plurality of supercapacitors; and
    a plurality of battery leads, each of the battery leads connected to one of the plurality of batteries.

12. The energy storage bank according to claim 1, wherein
    each of the plurality of supercapacitor leads is in contact with an adjacent one of the plurality of supercapacitor leads to form a first line and each of the plurality of battery leads is in contact with an adjacent one of the plurality of battery leads to form a second line, and
    the first line and the second line form a gas flow passage therebetween.

13. The energy storage bank according to claim 1, further comprising
    a single battery lead that connects each of the plurality of batteries in a first row, and
    a single supercapacitor lead that connects each of the plurality of supercapacitors in a second row, wherein
    the single battery lead runs alongside the single supercapacitor lead and a gas flow passage is defined between the first row and the second row.

14. The energy storage bank according to claim 13, wherein
    a heat exchanger is located within the gas flow passage, and
    the heat exchanger is one of a heat pipe and a tube and fin heat exchanger.

15. The energy storage bank according to claim 1, wherein
    a heat exchanger is connected to a surface of at least one of the batteries.

16. An energy storage bank comprising:
    a plurality of integrated energy storage devices comprising a plurality of supercapacitors, a plurality of batteries and a plurality of metal shells, each of the integrated energy storage devices comprising:
    a supercapacitor;
    a battery surrounding the supercapacitor such that the battery forms a shell around an exterior surface of the supercapacitor; and
    a metal shell surrounding the battery,
    the battery including a first anode, a first cathode, and an electrolyte disposed between the first anode and the first cathode,
    the supercapacitor including a second anode, a second cathode, and a separator disposed between the second anode and the second cathode,
    each of the plurality of supercapacitor leads being in contact with an adjacent one of the plurality of supercapacitor leads to form a first line and each of the plurality of battery leads is in contact with an adjacent one of the plurality of battery leads to form a second line, and the first line and the second line forming a gas flow passage therebetween.

17. An energy storage bank comprising:

a plurality of integrated energy storage devices comprising a plurality of supercapacitors, a plurality of batteries and a plurality of metal shells, at least one battery lead that connects each of the plurality of batteries in a first row; and at least one supercapacitor lead that connects each of the plurality of supercapacitors in a second row, each of the integrated energy storage devices comprising:

a supercapacitor;

a battery surrounding the supercapacitor such that the battery forms a shell around an exterior surface of the supercapacitor; and a metal shell surrounding the battery, the battery including a first anode, a first cathode, and an electrolyte disposed between the first anode and the first cathode, the supercapacitor including a second anode, a second cathode, and a separator disposed between the second anode and the second cathode, each of the at least one battery lead being parallel to each of the at least one supercapacitor lead on an upper end and a lower end of each of the plurality of integrated energy storage devices.

* * * * *